Aug. 1, 1967    W. L. KING ETAL    3,333,662
TORQUE CONVERTING DEVICE
Filed Oct. 4, 1965                                2 Sheets-Sheet 1

INVENTORS.
WILLIAM L. KING
NATHAN E. KNECHT
BY F. R. Geisler
ATTORNEY

INVENTORS.
WILLIAM L. KING
NATHAN E KNECHT
BY
ATTORNEY

United States Patent Office 3,333,662
Patented Aug. 1, 1967

3,333,662
TORQUE CONVERTING DEVICE
William L. King and Nathan E. Knecht, both of 3400
E. Main St., Springfield, Oreg. 97477
Filed Oct. 4, 1965, Ser. No. 492,825
3 Claims. (Cl. 192—57)

In general the present invention relates to coupling and transmission means through the medium of which a rotating driving element, operated by a source of power, transmits desired rotative power to the element being driven. Thus this invention is concerned with novel means by which torque from a driving member is converted to torque required on the part of a driven member.

An object of the invention is to provide improved power transferring or torque converting means through which the full transfer of torque from the driving element to the diven element will take place gradually, instead of suddenly, during the operating start.

A related object is to provide an improved torque transfer device in which the driving member, at the start of operation, will automatically be allowed to pick up speed, and thus to build up torque, before being required to transfer all acquired torque to the driven member.

Another object of the invention is to provide such a torque transfer device in which slippage between driving and driven elements in the device, occurring at the start of operation, will be gradually reduced until such time as full or desired rotational speed has been attained by the driving element and the building up of the speed of the driven element has reached to approximately the same amount, whereupon the driving and driven elements thence will operate substantially in unison.

A further object is to provide a torque transferring and converting device of the type above indicated in which, when the driving and driven elements have reached the point of rotating together in unison, they will continue to do so during the full operation of the entire assembly regardless of minor fluctuations in the amount of torque supplied or demanded.

An additional object of the invention is to provide a torque converting or power transferring device which will operate entirely automatically at all times.

A still further object is to provide such a device in which the main operating parts will be completely enclosed within a fluid-filled sealed housing, practically eliminating any maintenance problem and avoiding the possibility of any appreciable heat developing as a result of operation.

The manner in which these objects and other advantages are attained, and the manner in which the device of this invention is constructed as well as its manner of operation, will be readily understood from the following description with reference to the accompanying drawings wherein.

Figure 1:
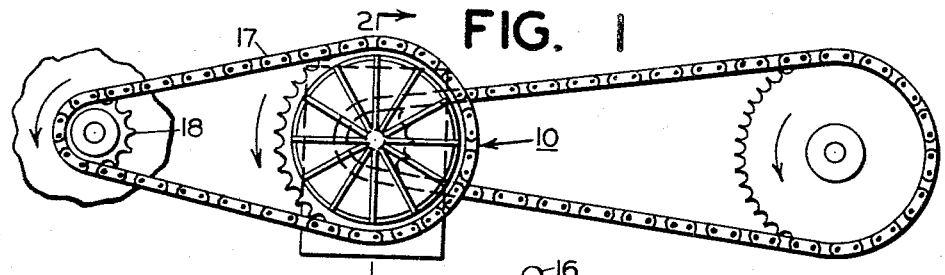
FIGURE 1 is a more or less diagrammatic elevation showing the torque converting device installed in place in an operating assembly intermediate between the source of motive power and the power-utilizing end means.
Figure 3:
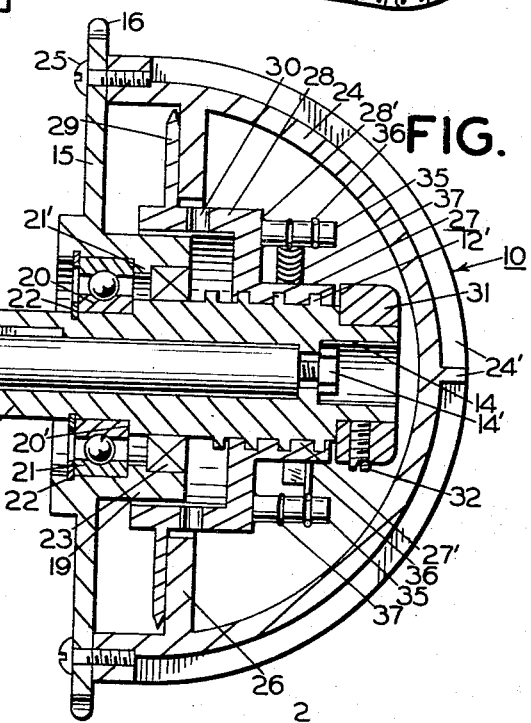
FIGURE 3 is a sectional elevation drawn to the same scale as FIGURE 2 and similar to FIGURE 2, but taken on a plane rotated nearly 90° from the plane of FIGURE 2, and thus taken on the line indicated at 3—3 in FIGURE 4 instead of on the line indicated at 2—2 in FIGURE 4, and also showing the actuating members in the device in the full operating position of the device.
Figures 2, 4:
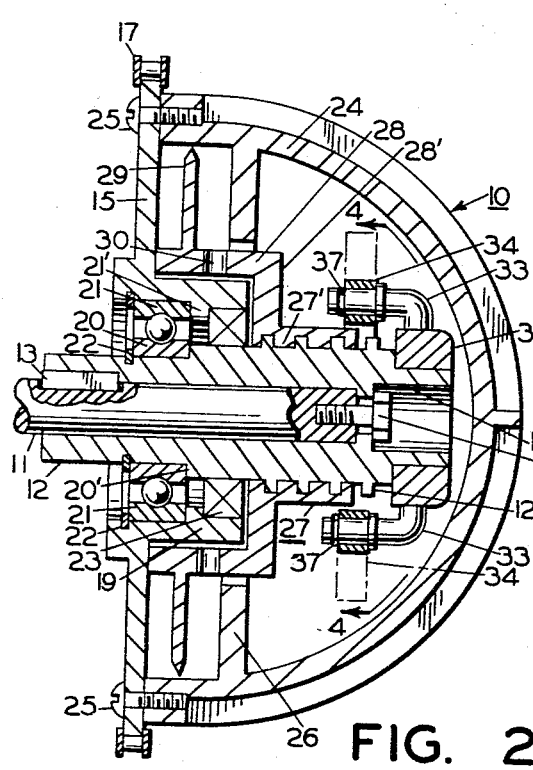
FIGURE 2 is a sectional elevation through the device taken on the line indicated at 2—2 in FIGURE 1, but drawn to a larger scale, this figure showing the various members within the device in the normal position when the device is not in operation, or at the start of operation.
FIGURE 4 is a fragmentary elevation taken within the device on the line indicated at 4—4 in FIGURE 2 with certain members in the positions which they occupy when the device is not in operation, or only starting to operate.

The entire device or torque transferring assembly includes a sealed liquid-containing housing, indicated at 10 in FIGURES 1, 2 and 3, rotatably mounted on the shaft 11 (FIGURES 1 and 2) which is driven through the intermediary of the device. In the form of the device illustrated the housing is mounted on the end portion of the driven shaft 11, which is suggested as the preferred arrangement.

A sleeve 12 (FIGURES 2 and 3) is keyed on the shaft 11 by the key 13 and forms substantially an integral part of the shaft. A recess 14 is provided in the end of the sleeve 12 to accommodate the head of a holding screw 14' which engages the end of the shaft and which, together with an intervening internal annular shoulder in the sleeve 12, prevents any possibility of the sleeve 12 becoming loose on the shaft 11.

Figure 6:
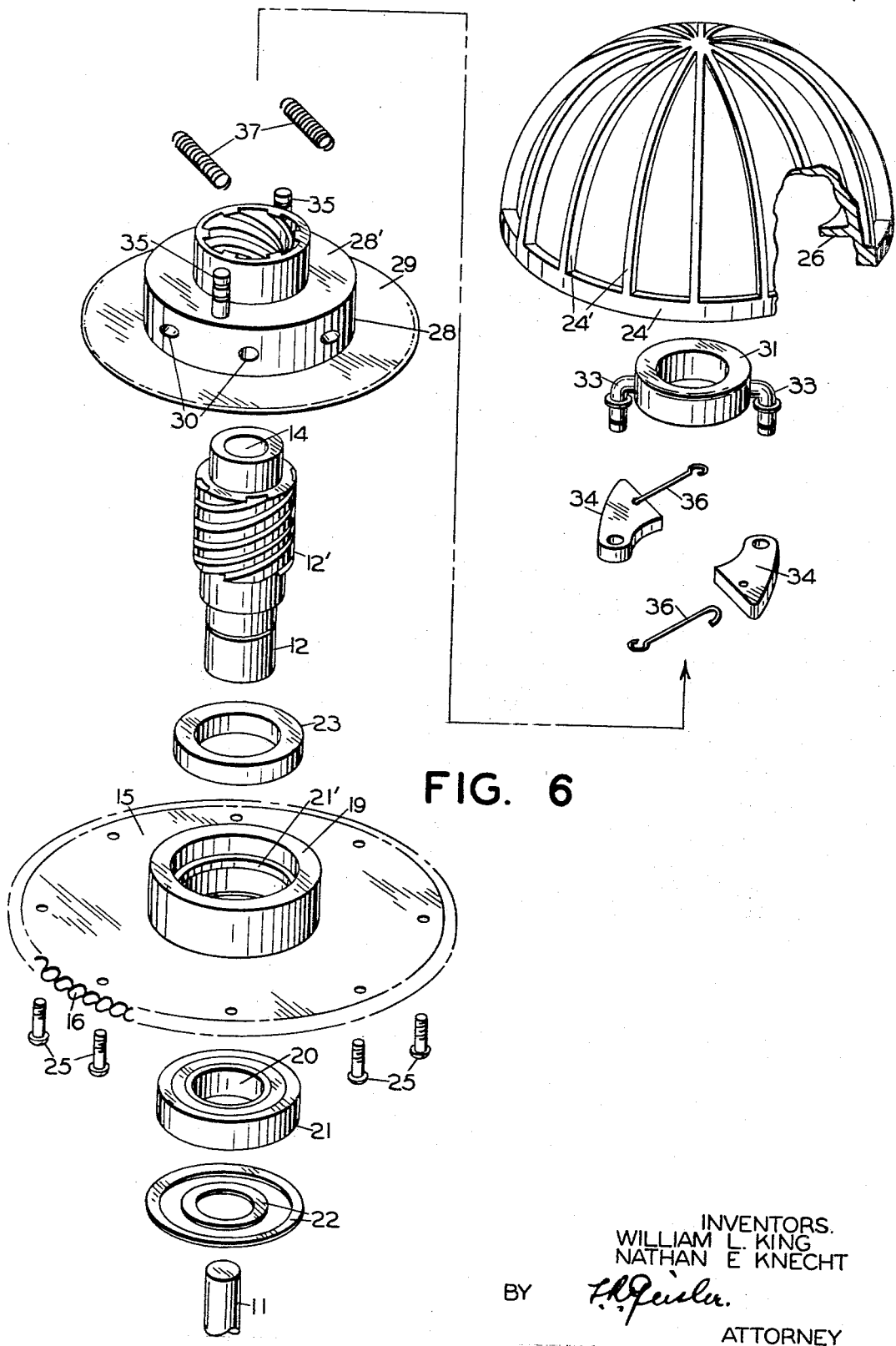
FIGURE 6 is an exploded view of the various members of the device shown in perspective and in substantially their relative location with respect to each other.

The housing 10 comprises a circular plate 15 (FIGURES 2, 3 and 6) and a semi-spherical shell 24 of approximately the same diameter which are tightly secured together by a series of screws 25 near their peripheries. The periphery of the plate 15 extends slightly beyond the periphery of the semi-spherical shell 24 and is formed into a ring gear provided with sprocket teeth 16. The outer surface of the semi-spherical housing shell 24 is formed with reinforcing ribs 24' and a peripheral flange shown best in FIGURE 6.

The circular housing plate 15 is formed with an internal hub flange 19 which is rotatably mounted on the shaft 11 and sleeve 12 by suitable ball bearings carried in inner and outer races 20 and 21 (FIGURES 2 and 3) secured on the sleeve 12 and in the hub flange 19 respectively, the inner ends of the races 20 and 21 engaging shoulders 20' and 21' on the sleeve and on the hub flange respectively, and the outer ends of these races being secured by a suitable locking ring 22. The mounting for the housing is completed by an oil seal ring 23. Thus the entire housing as a unit is rotatably supported on the shaft 11 and sleeve 12 and the mounting for the housing also includes sealing means preventing the escape of liquid contained in the housing.

An adjusting actuting member, designated as a whole by the reference 27 (FIGURES 2 and 3), includes a smaller diameter cylindrical portion 27' mounted on the sleeve 12 and a larger diameter cylindrical portion 28 integrally connected with the portion 27' by the annular wall 28' and having a slight clearance with the hub flange 19 of the housing plate 15. A portion of the outer wall of the sleeve 12 is formed with screw threads 12' (FIGURE 6) and the inner wall of the portion 27' of the actuating member 27 is correspondingly threaded so that the actuating member 27 has adjusting right hand screw engagement with the sleeve 12, and thus with the driven shaft 11, at all times.

The actuating member 27 also has an integral annular flange 29 (FIGURES 2 and 3) extending radially from the larger diameter portion 28 of the actuating member and spaced inwardly from the end of the larger diameter portion 28 in the relative position shown in FIGURES 2 and 3. As apparent, the right hand screw threads by which the member 27 is mounted on the sleeve 12 are so arranged that partial relative rotation of the member 27 with respect to the sleeve 12 will produce axial movement of the member 27 with respect to the sleeve 12 and thus with respect to the housing 10. FIGURES 2 and 3 show the member 27 at the limit of its axial movement in each direction respectively.

The semi-spherical shell 24 of the housing 10 is formed with an internal annular flange 26, positioned in the relative location shown in FIGURES 2 and 3. A suitable clearance is provided between the inner periphery of this flange 26 and the large diameter portion of the member 27. The member 27 is so constructed and arranged that at the limit of the axial movement of the member 27 in one direction (thus movement towards the left as shown in FIGURE 2), the larger diameter portion 28 of this member 27 will engage the housing plate 15, and at the limit of such axial movement in the opposite direction (thus towards the right as shown in FIGURE 3), the flange 29 of the member 27 will contact the flange 26 of the semi-spherical housing shell 24.

The housing 10 is filled with a suitable clutch liquid, the shear characteristics of which play an important part in the transmitting of the driving force or torque as will later be apparent. Preferably the liquid employed is silicone oil, which has a high viscosity, high resistance to heat, and a high shear resistance, and the torque-transmitting qualities of which are well known. In order to permit the described axial movement of the member 27 to take place without too much interference by the liquid in the housing, the member 27, in addition to having suitable clearance with the hub flange 19 of the housing plate 15 and with the internal flange 26 of the housing shell 24, is also provided with a plurality of ports 30 (FIGURES 2, 3 and 6) for passage of the liquid.

An end ring 31 is secured on a reduced diameter end portion of the sleeve 12, as shown in FIGURES 2 and 3, and is firmly secured thereon by suitable set screws 32. A pair of diametrically opposed arms 33 (FIGURES 2 and 6) extend radially outwardly from the ring 31 for a short distance and are formed with right angle bends so that their remaining portions extend inwardly parallel to the axis of the sleeve 12 and shaft 11. A pair of identical weights 34 (FIGURES 4 and 6) have their small end portions pivotally mounted on the pair of arms 33 respectively, the weights as viewed in FIGURE 4, extending in clockwise direction from their respective mounting arms.

A pair of diametrically opposite pins 35 (FIGURES 3, 4 and 5) are secured in the annular wall portion 28 of the member 27. As apparent from the figures the pins 35 are located in lines positioned approximately 90° from the lines of the ends of the arms 33. A pair of springs 37 each have one end secured to an arm 33 respectively and the other end secured to the pin 35 located nearest to the respective arm 33 in clockwise direction (as viewed in FIGURES 4 and 5). The springs 37 are under tension at all times. A link 36 extends from the end of each weight 34 opposite the pivotal mounting of the weight (in clockwise direction as viewed in FIGURES 4 and 5), to a pin 35.

When the device is at rest the tension of the springs 37 will have caused partial rotation of the member 27 with respect to the sleeve 12 and driven shaft 11 in clockwise direction (as viewed in FIGURE 4), which, due to the right hand screw mounting of the member 27 on the sleeve 12, will result in the member 27 being in the extreme left position shown in FIGURE 2. Any relative rotation of member 27 with respect to the sleeve 12 in counter clockwise direction will now cause member 27 to move axially towards the right (as viewed in FIGURE 2), such relative rotation being opposed by the tension of the springs 37. On the other hand, with such relative rotation of the member 27 the weights 34 will be free to swing outwardly.

In the arrangement as illustrated in FIGURE 1 the sprocket teeth on the periphery of the housing plate 15 are connected by sprocket chain 17 with the drive sprocket 18 of a motor or other source of power, and a sprocket on the driven shaft 11 is connected by a sprocket chain with the work or power-utilizing end means. At the start of operation, with the actuating member 27 in the position shown in FIGURE 2 (and also in FIGURE 4), the rotation of the housing plate 15 and semi-spherical housing shell 24, in counter clockwise direction as indicated, will cause rotation of the liquid within the housing 10 and this liquid will exert a rotational torque pull on the member 27 and thence on the driven shaft 11. As the rotational speed of the housing and contained liquid builds up, and consequently as the torque pull on the member 27 and driven shaft 11 increases, the member 27 moves to the right against the force of the springs 37 until the member 27 arrives at the final position shown in FIGURE 3 at which time the slippage between the housing internal flange 26 and the flange 29 of member 27 will cease. Since the member 27 cannot move further to the right, due to the engagement with the housing internal flange 26, the member 27 and the driven shaft 11 will be rotated in unison. Thus the housing, as the driving element, the member 27, and the driven shaft 11 now rotate in unison with the member 27 becoming the full torque converter.

Figure 5:
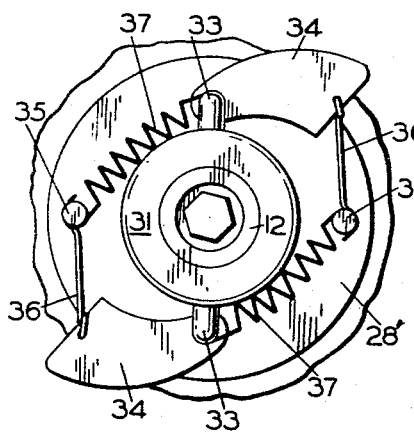
FIGURE 5 is a fragmentary elevation similar to FIGURE 4 but illustrating the position of the same members when the device is in full operation.

At the same time as the member 27 moves to the right as described, the pivotally mounted weights 34 move outwardly, and, as the rotational speed builds up, the centrifugal pull on these weights holds them in the outward position shown in FIGURE 5 entirely overcoming the increased tension of the springs 37. In this way the driving contact engagement of flange 26 with flange 29 is maintained when the rotational speed has been built up and since the weights 34 will tend to remain in this outward position as long as a sufficiently minimal rotational speed of the entire assembly continues, the full torque conversion will be maintained and will not be affected by slight minor fluctuations in driving speed or torque requirements. When the driving power is discontinued and rotation of the housing 10 ceases the springs 37 will again bring the member 27 back to the starting rest position shown in FIGURE 2.

The movement of the member 27 from starting position to full torque converting position and back thus takes place entirely automatically. The sealed-in liquid in the housing 10 practically eliminates the common problem of heat and wear encountered in many clutch drives and torque transfer means, and, as apparent, this device, when once properly placed in operation, requires no appreciable upkeep.

We claim:
1. In a coupling and torque converting device, a driven shaft, a sealed housing rotatably mounted on said shaft, said housing containing clutch liquid, said housing connected with a source of power conveying rotational torque to said housing, an actuating member for said driven shaft carried on and connected with said shaft within said housing, a pair of cooperating elements secured on said member and secured in said housing respectively causing said member to be rotated in unison with said housing when said cooperating elements are held in contact, a spiral mounting connecting said member with said driven shaft so arranged as to cause axial movement of said member in said housing when said member is rotated relatively with respect to said shaft, whereby said element on said member will move toward said cooperating element in said housing when the driving torque received by said member rotates said member relatively with respect to said shaft, and resilient means connected with said member and with said shaft exerting a force tending to prevent relative movement of said member to bring said element on said member into contact with said cooperating element in said housing, whereby, when rotation is imparted to said housing, said member and said shaft will not be rotated in unison with said housing until the torque pull on said member has become sufficient to cause said element on said member to be brought into contact with said element in said housing.

2. In a coupling and torque converting device, a driven shaft, a sealed housing rotatably mounted on said shaft, said housing containing a viscous liquid having high shear resistance, said housing connected with a source of power conveying rotational torque to said housing, an actuating member for said driven shaft carried on and connected with said shaft within said housing, an operating flange secured on said member, a cooperating flange secured in said housing, said flanges causing said member to be rotated in unison with said housing when said flanges contact each other, a spiral mounting connecting said member with said driven shaft so arranged as to cause axial movement of said member in said housing when said member is rotated relatively with respect to said shaft, whereby said flange on said member will move towards said cooperating flange in said housing when the driving torque received by said member rotates said member relatively with respect to said shaft, and spring means connected with said member and with said shaft exerting a force tending to prevent relative movement of said member to bring said flange on said member into contact with said cooperating flange in said housing, whereby, when rotation is imparted to said housing, said member and said shaft will not be rotated in unison with said housing until the torque pull on said member has become sufficient to cause said flange on said member to be brought into contact with said flange in said housing.

3. An automatic coupling and torque converting device including a driven shaft, a sealed housing rotatably mounted on said shaft, said housing containing a viscous liquid having high shear resistance, said housing connected with a source of power conveying rotational torque to said housing, an actuating member for said driven shaft carried on and connected with said shaft within said housing, an integral flange on said member, a cooperating integral flange in said housing, said flanges causing said member to be rotated in unison with said housing when said cooperating flanges contact each other, a spiral mounting connecting said member with said driven shaft so arranged as to cause axial movement of said member in said housing when said member is rotated relatively with respect to said shaft, whereby said flange on said member will move towards said cooperating flange in said housing when the driving torque received by said member rotates said member relatively with respect to said shaft, spring means connected with said member and with said shaft exerting a force tending to prevent relative movement of said member to bring said flange on said member into contact with said cooperating flange in said housing, whereby, when rotation is imparted to said housing, said member and said shaft will not be rotated in unison with said housing until the torque pull on said member has become sufficient to cause said flange on said member to be brought into contact with said flange in said housing, and centrifugally-actuated means connected with said member and with said shaft operating in opposition to said spring means so arranged as to exert a force to maintain said flange of said member in contact with said cooperating flange in said housing when said member has acquired sufficient rotational speed.

References Cited
UNITED STATES PATENTS

| | | | |
|---|---|---|---|
| 1,806,332 | 5/1931 | Chryst | 192—105 |
| 1,924,723 | 8/1933 | Howak | 192—103 X |
| 3,160,252 | 12/1964 | Steinlein | 192—103 X |
| 3,250,351 | 5/1966 | Quynn | 192—57 X |
| 3,280,948 | 10/1966 | Carriere | 192—57 X |

MARK NEWMAN, *Primary Examiner.*

A. H. McKEON, *Assistant Examiner.*